United States Patent [19]

Jenekhe

[11] Patent Number: 4,758,634

[45] Date of Patent: * Jul. 19, 1988

[54] METHOD OF MAKING ELECTROACTIVE POLYMERS HAVING AROMATIC AND QUINONOID BONDING STRUCTURES

[75] Inventor: Samson A. Jenekhe, Bloomington, Minn.

[73] Assignee: Honeywell Inc., Minneapolis, Minn.

[*] Notice: The portion of the term of this patent subsequent to Jan. 5, 2005 has been disclaimed.

[21] Appl. No.: 904,748

[22] Filed: Sep. 8, 1986

[51] Int. Cl.$^4$ .............................................. C08L 61/02
[52] U.S. Cl. .................... 525/398; 525/400; 525/401; 525/402; 528/483
[58] Field of Search ............... 525/398, 400, 401, 402; 528/483

[56] References Cited

U.S. PATENT DOCUMENTS

| | | | |
|---|---|---|---|
| 4,204,216 | 5/1980 | Heeger et al. | 357/8 |
| 4,222,903 | 9/1980 | Heeger et al. | 252/518 |
| 4,452,725 | 6/1984 | Wellinghoff et al. | 252/500 |
| 4,487,667 | 11/1984 | Traynor | 204/59 R |
| 4,490,509 | 12/1984 | Kossmehl et al. | 525/328 |
| 4,508,639 | 4/1985 | Camps et al. | 252/500 |
| 4,548,696 | 10/1985 | Weaver, Jr. | 204/290 |
| 4,548,738 | 10/1985 | Jenekhe et al. | 252/500 |

FOREIGN PATENT DOCUMENTS

3119593 -2/1972 Fed. Rep. of Germany .

OTHER PUBLICATIONS

Phenylene-Based Conducting Polymers; Handbook of Conducting Polymers, vol. 1, T. A. Skotheim et al; 1986.
Electrochemical Preparation and Characterization of Conducting Polymers; Chemica Scripta 17; IBM Research Laboratory.
New Electrochemically Generated Organic Conducting Polymers; J. Electroanal. Chem., 135 (1982) pp. 173-178.
Poly(isothianaphthene); F. Wudl, et al; 1984 American Chemical Conjugated one and two dimensional polymers; Myung-Hwan Whangbo et al; Proc. R. Soc. Lond. A. 366, 23-46 (1979).
Band Structure of AIAs-GaAs (100) Superlattices; J. N. Schulman et al; Physical Review Letters, vol. 39, No. 26.
The CdTe/HgTe superlattice: Proposal for a new infrared material; J. N. Schulman et al; Appl. Phys. Lett. 34(10), May 15, 1979.

Primary Examiner—Joseph L. Schofer
Assistant Examiner—Bernard Lipman
Attorney, Agent, or Firm—C. G. Mersereau

[57] ABSTRACT

Electroactive polymers of the structure and formula

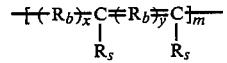

in their neutral and ionized forms, where the backbone group $R_b$ is selected from or is a combination of five- and six-membered rings capable of aromatic and quinonoid bonding structures, $R_s$ is selected from aliphatic, aromatic and heterocyclic groups and x, y are positive integers from 1 to 5 and m is a positive integer from 2 to about 10,000, together with a method of making them are disclosed.

33 Claims, 1 Drawing Sheet

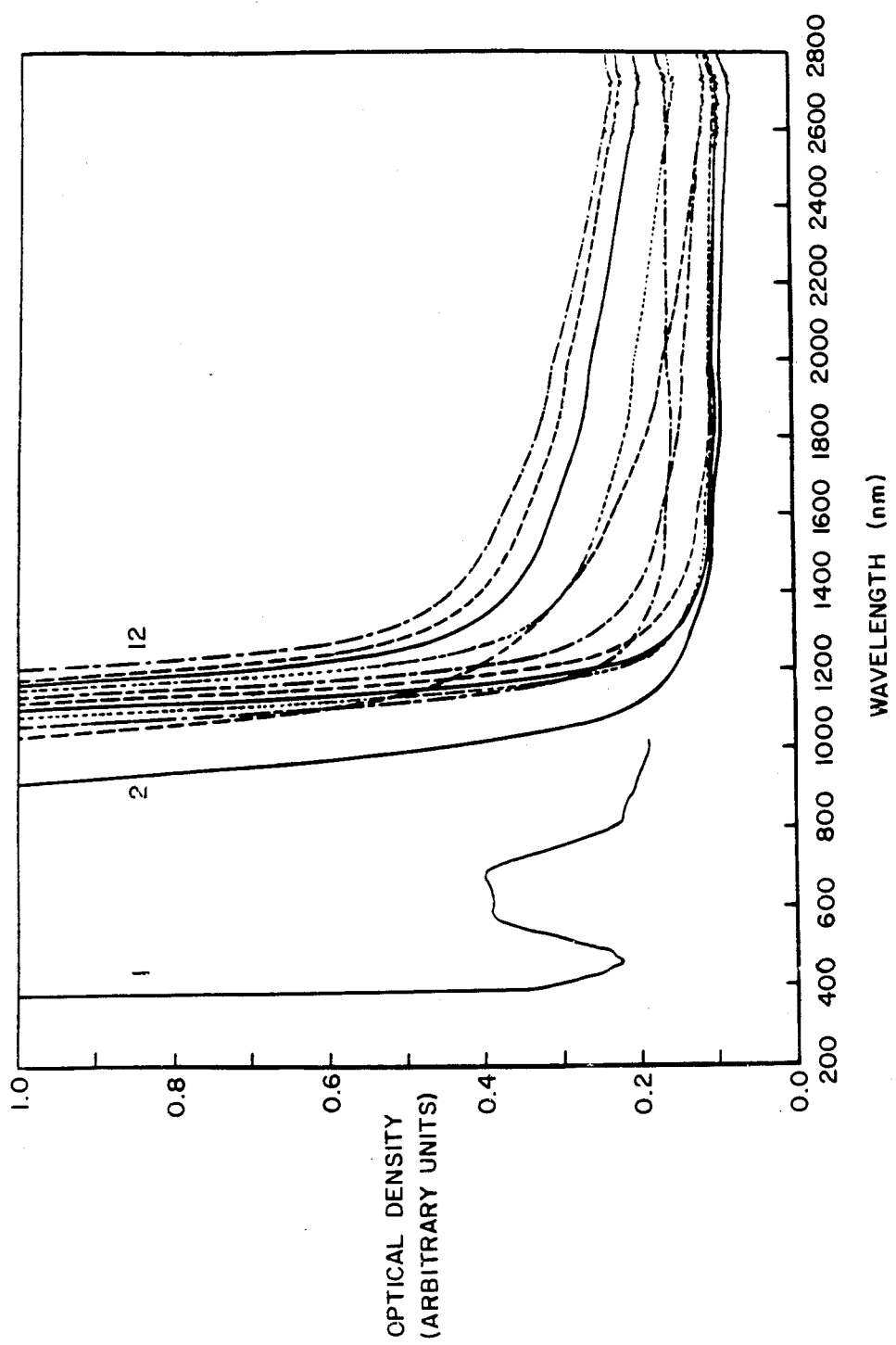

METHOD OF MAKING ELECTROACTIVE POLYMERS HAVING AROMATIC AND QUINONOID BONDING STRUCTURES

BACKGROUND OF THE INVENTION

The Government has rights in this invention pursuant to a contract awarded by the Department of the Navy.

FIELD OF THE INVENTION

This invention relates to electroactive and conjugated polymers in general and, in particular, electroactive polymers in which aromatic and quinonoid segments are incorporated into the polymer backbone in particular.

CROSS REFERENCE TO RELATED APPLICATIONS

Reference is made to application Ser. No. 905,084, entitled "Method of Making Electroactive Heterocyclic Aromatic Polymers," of S. A. Jenekhe, the inventor in the present application, and M. K. Hansen which is filed of even date and assigned to the same assignee as the present application. That invention is concerned with a method of making polymers and copolymers which contain five-membered aromatic heterocycles in the main chain and have a non-quinonoid bonding structure. The present invention, on the other hand, is concerned with a method of making electroactive polymers in which the backbone groups are selected from one or a combination of five- and six-membered rings which may or may not be heterocyclic but which are capable of aromatic and quinonoid bonding structures in the backbone. The compounds of Ser. No. 905,084, first above, are contained in Ser. No. 904,747 of identical inventorship, ownership and filing date, and the polymers and copolymers of the present invention is the subject of Ser. No. 904,746, also of identical inventorship as the present application, even of filing date and assignee.

DESCRIPTION OF THE PRIOR ART

Electroactive polymers which exhibit semiconductive, conductive, electrochemical, electro-optical, or nonlinear optical properties are useful for applications in electronics, electro-optics, batteries, sensors, nonlinear optics or future molecular devices. Many electroactive polymers are currently known but the need and search for novel electroactive polymers of improved or novel properties for these various technological applications remains.

Electroactive polyacetylene, $(-CH=CH-)_m$, which can be polymerized into a film and doped p-type or n-type to a highly conductive state has been described in detail by Heeger et al in U.S. Pat. Nos. 4,204,216 and 4,222,903.

The acromatic polymer poly(p-phenylene),

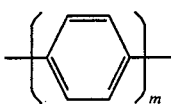
(1)

is also electroactive and can be treated with various electron acceptor or donor molecules to give highly conductive materials. Numerous derivatives of poly(p-phenylene) of the form

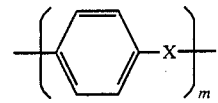
(2)

are also known to be electroactive and dopable to conductive materials. The most important of these poly(p-phenylene) derivatives include poly(p-phenylene vinylene) when $X=CH=CH$ and poly(phenylene sulfide) when $X=S$. The preparation and properties of the various phenylene-based electroactive polymers are described in a review article "Phenylene-Based Conducting Polymers" by R. L. Elsenbaumer and L. W. Shacklette (in *Handbook of Conducting Polymers*, Vol. 1, T. A. Skotheim, ed., Marcell Dekker, 1986, pp. 213–263).

Electroactive polymers based on the five-membered ring,

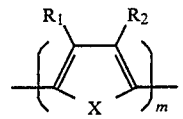
(3)

where $R_1$ and $R_2$ are hydrogen or alkyl, groups including polypyrroles ($X=N-H$), polythiophenes ($X=S$) and polyfurans ($X=O$) have been described by A. F. Diaz (*Chemica Scripta*, Vol. 17, pp. 145–148, 1981), G. Tourillon and F. Garnier (*J. Electroanal. Chem.* 135, pp. 173–178, 1982), Weaver et al in U.S. Pat. No. 4,548,696 and L. Traynor in U.S. Pat. No. 4,487,667. These electroactive five-membered ring polymers are generally prepared by electrolysis of the various heteroaromatic monomers, such as pyrrole, thiophene, furan and their derivatives as described by Diaz in the above reference. Copolymers of five-membered and six-membered rings of the formula

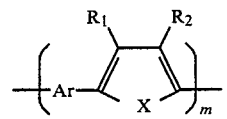
(4)

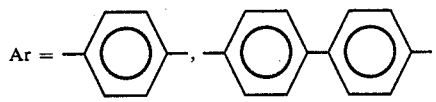

where Ar is a phenylene group have been described by Camps et al in U.S. Pat. No. 4,508,639. A fused six-membered and five-membered ring system having the formula

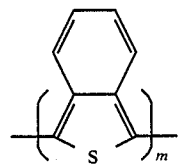
(5)

has been described by Wudl et al (*J. Organic Chem.*, Vol. 49, pp. 3382–3384, 1984).

Electroactive polycarbazoles of the formula

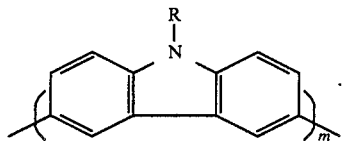
(6)

have been described by Wellinghoff et al in U.S. Pat. No. 4,452,725. Derivatives of polycarbazoles having the formula

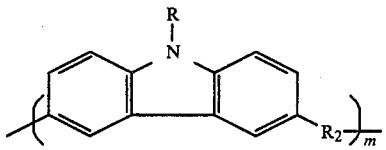
(7)

where $R_2$ is a lower alkene group, have been disclosed by Jenekhe et al in U.S. Pat. No. 4,548,738.

All of the above prior art electroactive polymers exhibit some desired semiconducting, electrochemical or optical properties to various degrees. Similarly, they exhibit processibility to films and other desired shapes and stability in ambient conditions of temperature, air, moisture and pressure to varying degrees. For example, polyacetylene and poly(p-phenylene) are generally unstable in ambient air when doped to the highly conductive state but they exhibit the highest levels of conductivity (about 100–1000 ohm$^{-1}$cm$^{-1}$) among currently known electroactive polymers. The polycarbazoles combine environmental stability with processibility but the levels of conductivity achievable are orders of magnitude lower than polyacetylene.

One of the most important parameters which govern the electroactivity of a polymer and its electronic, electrochemical, and optical properties is the semiconductor band gap ($E_g$) which is the energy gap separating the valence ($\pi$) and conduction ($\pi^*$) bands of the solid material, according to the electronic band theory of solids. A metallic solid material has a zero or near zero band gap; an intrinsically semiconducting material has a band gap which falls between about 0.2 and 2.0 eV. Materials with band gaps greater than about 2.0 eV are insulators. Most prior art electroactive polymers have band gaps, as determined from optical absorption, for example, greater than 2 eV which make them intrinsic insulators. Some prior art polymers that are intrinsic semiconductors are: polyacetylene, $E_g$, 1.5 eV; the polymer of formula 5 (polyisothianaphthene), $E_g$, 1.13 eV; and poly(2,5-thiophenediyl), the polymer of formula 3 with $R_1=R_2=H$ and $X=S$, $E_g$, 2 eV. On the other hand, poly(p-phenylene) of formula 1 and polypyrrole of formula 5 with $R_1=R_2=H$ and $X=N-H$ both have band gaps greater than 3 eV. When all these prior art electroactive polymers are doped, localized electronic levels attributed to solitons (in the case of polyacetylene only), polarons (radical ions) and bipolarons (di-ions, e.g., dications) are generally believed to be generated within the band gap. These localized electronic states effectively reduce the band gap as evidenced by new doping-induced optical absorption bands at photon energies below the intrinsic band gap ($E_g$). It is clear that the goal in the search for new electroactive polymers must be to achieve intrinsic semiconductors or metals without doping, which means to achieve a narrow band gap in polymeric materials. Also, it is desirable to be able to tune the band gap, and hence, intrinsic electronic, electrochemical and optical properties via molecular structures and synthetic process.

Theoretical studies have established that the band gap of a polymeric material depends on both the number of atoms (and type) and electrons in the periodically repeating unit and how the atoms are geometrically arranged within the repeating unit (see for example, M.-H. Whangbo, R. Hoffmann and R. B. Woodward, Proc. Royal Soc. London A366, pp. 23–46, 1979. The variation of the number and type of atoms in a polymer repeating unit within an essentially fixed geometric structure as a way of varying the band gap, and hence electronic and optical properties is well known and practice in prior art as represented by polymers of formulae 2, 3, 4 and 7, for example. The tailoring of band gap and derivative electronic and optical properties of polymers by variation of the geometrical structure of a fixed group of atoms has not been experimentally realized or even tried in the prior art. Whangbo et al in the above reference have theoretically calculated that the aromatic compound of formula 8 has a band gap of 1.89 eV compared to 0.47 eV for the quinonoid compound of formula 9, giving a rather large difference in band gap of 1.42 eV even though the number and type of atoms are identical in both polymeric compounds.

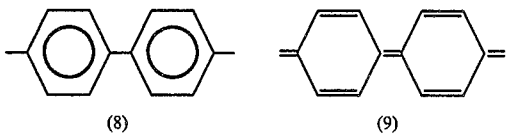

(8)          (9)

A similarly large difference in the band gaps of the polymeric compounds of formulae 10 and 11, for example,

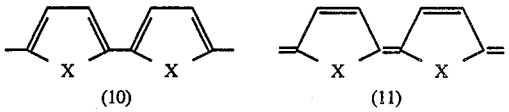

(10)         (11)

is expected. No electroactive polymer of quinonoid geometry, such as those shown in formulae 9 and 11, is experimentally known in prior art. On the other hand, numerous aromatic electroactive polymers, such as those of formulae 1 to 8, are well known in prior art.

One common practice for achieving the desired chemical and physical properties of polymers in general is through copolymerization to give random, alternating or block copolymers. If the repeating units of two homopolymers to be blended are A and B, the three types of copolymers possible are:

| | |
|---|---|
| ... ABAAABBABAABBBBAB ... (random) | (12a) |
| ... ABABABABABABABAB ... (alternating) | (12b) |
| ... AAAABBBBAAAABBBB ... (block) | (12c) |

The polymer of formula 2 when X=CH=CH and all those of formula 4 are examples of electroactive alternating copolymers. Random and block copolymers which are electroactive are also known in the prior art. However, the band gap, and hence electronic and optical properties, in contrast to other properties such as solubility, mechanical properties, glass transition temperature, melting points, birefringence, etc., of prior art copolymers did not improve, but remained in the insulator range.

The lack of success in trying to achieve improved band gap and electronic properties in prior art copolymers is due to several factors. These include lack of symmetry, geometric packing problems in the copolymer "repeating unit", such as lack of coplanarity between A and B segments, and the large band gaps of the homopolymers $(-A-)_m$ and $(-B-)_m$.

In contrast to this failure to achieve narrower or improved band gaps by conventional composition blending in organic compounds and polymers random or spatially ordered, alloys of inorganic semiconductors are well-known to give improved electronic properties. For instance, the semiconductors HgTe and CdTe, respectively, have band gaps of 0 and 1.6 eV; the random alloys $Hg_{1-x}Cd_xTe$ have band gaps between 0 and 1.6 eV given precisely by the composition parameter x. Similarly, the band gap of $Al_xGa1-xAs$ is about 1.47 eV when x=0 and increases with increasing x. If two inorganic semiconductors are grown with spatially periodic alternating structures such as in formulae 12b or 12c, for instance if A is $Al_{0.2}Ga_{0.8}As$ and B is GaAs in such structures, novel semiconductor materials known as compositional superlattices are obtained (see for example, J. N. Schulman and T. C. McGill, "Band Structure of AlAs-GaAs(100) Superlattices," *Phys. Rev. Lett.* 39, pp. 1680–1683, 1977 and "The CdTe/HgTe Superlattice: Proposal for a New Infrared Material," *Appl. Phys. Lett.* 34, pp. 663–665, 1979). The essence of such compositional superlattices is the alternating spatially periodic (in one direction) arrangement of two semiconductor materials of different band gaps.

The discovery that by incorporation of both aromatic and quinonoid groups into a periodically repeating unit of a polymer chain or in the general manner of formulae 12a, 12b, or 12c the band gap of the resultant electroactive polymer can be made smaller or tunable compared to a similar polymer with solely aromatic geometry forms the basis of the present invention.

SUMMARY OF THE INVENTION

This invention is directed to provide the novel electroactive polymers of structural formula 13 including their neutral and ionized forms,

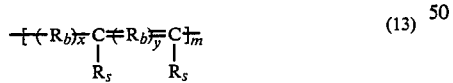
(13)

where the backbone group $R_b$ is selected from or is a combination of five- and six-membered rings capable of aromatic and quinonoid bonding structures in the classes of pyrroles, thiophenes, furans, selenophenes, tellurophenes, 1,3-azoles such as imidazole, thiazole, and oxazole, para-phenylenes, pyridine (azabenzene). Some examples of $R_b$ including aromatic and quinonoid forms thereof are as follows:

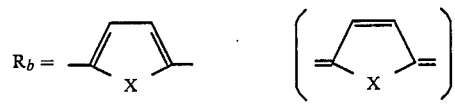

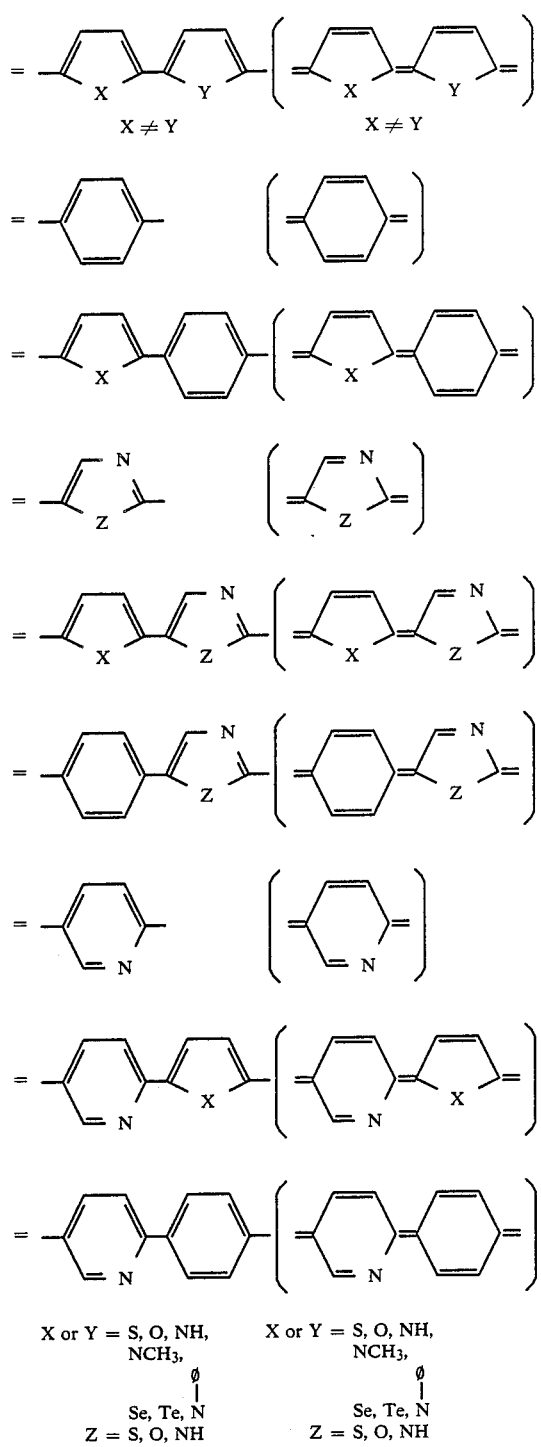

X or Y = S, O, NH, NCH₃, Se, Te, N—φ
Z = S, O, NH

X or Y = S, O, NH, NCH₃, Se, Te, N—φ
Z = S, O, NH

The side-chain group $R_s$ may be any aliphatic, aromatic or heterocyclic group, such as the following:

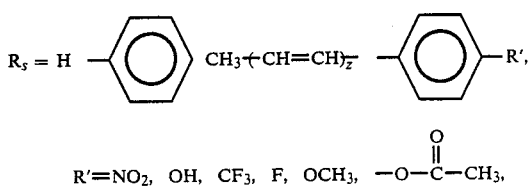

R'=NO₂, OH, CF₃, F, OCH₃, —O—C(=O)—CH₃,

-continued

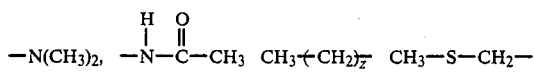

The variables x and y are positive integers having a value from 1 to 5 and m is a positive integer having a value from 2 to about 10,000.

The preferred general method for the synthesis of the electroactive conjugated polymers of this invention involves the conversion of existing nonconjugated polymer precursors containing alternating sp$^3$ carbon atom and conjugated rings in the backbone to conjugated polymers using chemical and electrochemical methods. This conversion, whether electrochemical or chemical, involves elimination of a hydrogen atom or ion from each bridge carbon atom (sp$^3$) separating the conjugated five-membered or six-membered rings in the main chain resulting in the creation of conjugated carbon-carbon double bonds (sp$^2$) in the polymer backbone, and hence a conjugated polymer with alternating aromatic and quinonoid sequences as may be represented in Scheme 1 as follows:

SCHEME I

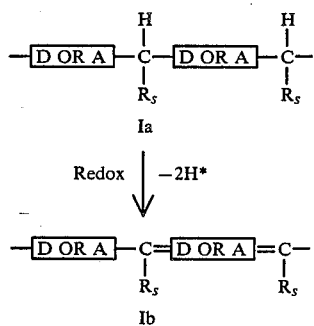

where H* denotes a hydrogen atom or ion and where the sp$^3$ and sp$^2$ bridge carbon atoms are represented respectively by

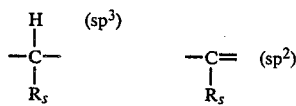

A represents aromatic or hetero-aromatic π-electron acceptor conjugated segments of a polymer main chain. D represents aromatic or hetero-aromatic π-electron donor conjugated segments of a polymer main chain. An important feature of A and D is that they are capable of both aromatic and quinonoid bonding structures. The resultant polymers of Structure Ib in scheme 1 are identical to those of formula 13.

Though the electroactive conjugated polymers of this invention are useful for various semiconducting, electrochemical and optical applications in their neutral (undoped) form, they can be ionized followed by compensation with a suitable counterion by chemical or electrochemical doping using the doping agents and techniques taught in prior art (see, for example, the above references of Heeger et al, A. F. Diaz, Tourillon and Garnier, Wellinghoff et al and Jenekhe et al). Such doping further enhances the electrical conductivity above the prestine value.

BRIEF DESCRIPTION OF THE DRAWING

The single FIGURE depicts optical absorption spectra of certain polymers of the invention.

DETAILED DESCRIPTION OF THE INVENTION

The synthesis of the polymers of the present invention from nonconjugated precursors followed a general process of Scheme 1.

A particular example of the general structure of suitable precursors of formula Ia in Scheme 1 is shown as formula 14 below:

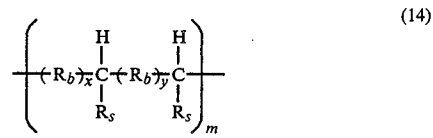

Thie general method of converting existing nonconjugated polymers containing isolated sp$^3$-carbon atoms (—CR$_s$H—) to the conjugated polymers with alternating aromatic and quinonoid sequences by reduction-oxidation (redox) elimination can be accomplished by any of several chemical and electrochemical processes. In any of such processes employed the polymer precursor as substrate for the reaction is usually in solution or in the solid state. Among suitable conversion processes include: chemical reaction on a solid film or powder of a precursor exposed to oxidative or reductive vapor or gaseous reagent; immersion of the solid precursor in a film or powder form in a non-solvent liquid redox reagent; treatment of solutions of the precursor with a miscible or non-miscible liquid or gaseous redox reagent; electrochemical redox treatment of supported or unsupported films or solutions of the precursor polymer in an electrochemical cell. The specific one of these processes employed to implement the general method of Scheme 1 will depend on the desired purpose, intended application, as well as on the starting precursor. Suitable chemical redox reagents include electron acceptor or donor gases or vapors such as Br$_2$, I$_2$, Cl$_2$, AsF$_5$, AsF$_3$, BF$_3$, SO$_3$, BF$_3$, and their solutions, any strong organic or organometallic base such as solutions of alkyl-lithium (e.g. methyl lithium, n-butyl lithium, etc.) and alkali (K, Li, Na) anthracides and naphthalides.

It is noteworthy that these chemical redox reagents are similar or related to reagents normally employed in prior art doping of conjugated polymers to produce p-type (polymeric cations) or n-type (polymeric anions) materials (see, for example, the above references of Heeger et al, Wellinghoff et al, and Jenekhe et al). However, the non-conjugated precursors, containing conjugated rings capable of both aromatic and quinonoid bonding structures separated by (—CR$_2$H—) bridges, when treated with these redox reagents, yield the conjugated polymers of formula 13 by virtue of their nature. Similarly, using prior art electrochemical doping techniques and reagents such as electrolytes containing suitable ions (Li$^+$, ClO$_4^-$, BF$_4^-$, PF$_6^-$, AsF$_6^-$, HSO$_4^-$, etc.) (see, for example, the above references of Diaz and Tourillon et al) yield the conjugated polymers of this invention. The resultant conjugated polymers containing alternating aromatic and quinonoid sequences in the main chain are subsequently chemically or electrochemically doped using standard techniques (see above references, Heeger et al, Diaz, Wellinghoff et al, and Jenekhe et al) to further increase their conducting properties, if so desired.

Where a suitable non-conjugated polymer precursors for the synthesis of desired conjugated polymers of formula 13 is not available then of necessity a two-step method is used: first, a precursor polymer with a structure of formula Ia in Scheme 1 is obtained by any suitable addition or condensation polymerization process; secondly, conversion to conjugated polymers of formula 13 is made using the method of Scheme 1.

The heterocyclic alternating copolymers of thiophenes, furans and pyrroles or dimers or trimers thereof and/or substitutions thereof were generally synthesized by treatment of the respective electron donor monomer with the desired aldehyde in a suitable solvent such as p-dioxane in a protic solution containing a protic acid catalyst such as concentrated $H_2SO_4$. This produced nonconjugated precursor polymers containing alternating $sp^3$ carbon atoms (—CRH—) and heteroatomic conjugated units as follows:

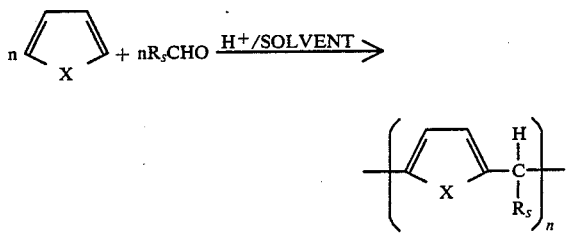

This two-step synthesis can also be used to achieve both symmetric, i.e. $x=y$, or non-symmetric, i.e., $x=y$ polymers in accordance with Structure 13. It is noteworthy that the basic linear structure of the conjugated polymers is the same as that of the precursors; the structure of the precursors was readily established by spectroscopic techniques including infrared spectra. The precursor polymers have been characterized by various spectroscopic techniques including infrared and electronic spectra, elemental analysis, molecular weight studies, and thermal analysis. The preparation of some of the precursors is discussed in greater detail in above referenced Ser. No. 905,084 which, to the extent required, is incorporated herein by reference.

The conversion represented by Scheme 1 can be monitored or ascertained by several methods. We have used infrared and electronic spectra as the primary evidence of the elimination of the bridge hydrogens from the precursor polymers. Elemental analysis and the relative insolubility of polymers 13 compared to polymers 14 as additional proof of the redox elimination. The kinetics and extents of conversion were readily studied using the former two methods. Color as visually observed and electrochemical investigation of the redox properties of polymers 13 and 14, for example by cyclic voltametry, were also used to monitor the progress of the reaction of Scheme 1.

As desired the polymers 13 generally have small band gaps. For a fixed $R_s$ the band gap varies both as the nature of $R_b$ varies as well as the intergers x and y. Similarly, for a fixed $R_b$ and a fixed x and y the band gap varies as $R_s$ although less dramatically than band gap variation with $R_b$ and x and y. Some of the smallest values of the band gap were obtained when $R_b$ was 2,5-thiophenediyl and $x=y$; in this particular case, the band gap decreased from 1.1 eV ($x=y=1$) to 0.75 eV ($x=y=3$). Thus, there is considerable flexibility for tailoring the electronic and optical properties of the electroactive polymers 13 of this invention to various applications.

Contemplated equivalents of the compounds of general formulae 13 and 14 are compounds otherwise corresponding thereto and having the same general properties wherein one or more of $R_b$–$R_s$ are simple variations of the substituents as defined therein, e.g., wherein any of $R_b$ can be a substituted five-membered ring and $R_s$ a substituted alkyl group. As will be apparent, where a substituent can be a hydrogen atom, the exact chemical nature of a substituent which is other than hydrogen at that position is not critical, so long as it does not adversely affect the overall spectrum of activity of the polymer.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. The polymeric compounds of the present invention and their methods of making are thus further illustrated by the following examples:

EXAMPLES 1–4

In Examples 1–4 conjugated polymers of the generic formula 13 were produced from unconjugated precursor polymers of structure 14 in which the backbone group, $R_b$, was 2,5-thiophenediyl and $x=y=2$. Solid films of the four different precursor polymers were cast onto glass and sapphire substrates from tetrahydrofuran (THF) and N,N-dimethylformamide (DMF) solutions and dried.

One set of films of the four different precursors was placed, one film at a time, in a sealed glass vessel which was evacuated to reduce the pressure. Next, bromine vapor at room temperature was admitted into the vessel to react with the polymer film. Controlled identical experiments performed on the various films and monitored in situ by spectroscopic techniques, such as infrared and optical absorption spectroscopies, showed the progress of elimination of the bridge hydrogens as hydrogen bromide (HBr) with time over a period of 24 hours after which no changes in either electronic or infrared spectra were observed. Thus, exhaustive conversion of the precursors to the desired conjugated polymers of formula 13 can be ascertained by spectroscopic techniques. A polymer of intermediate degree of conversion, which may be desired for its electronic and optical properties, was obtained at times shorter than needed for exhaustive conversion at 23° C. After the desired exhaustive conversion reaction time, the bromine vapor was evacuated from the vessel and the film removed.

The elimination reaction was repeated for each of the four starting precursor polymers using iodine vapor at 50° C. These conversions of the precursor polymers of Examples 1–4 to the conjugated polymers of formula 13 is illustrated by the reaction Scheme 2

SCHEME 2

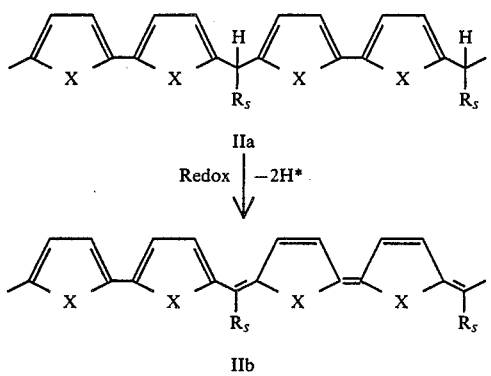

where X=S and $R_s$ is defined below. Although the detailed mechanism, for example, reaction intermediates, of this elimination reaction are not yet fully understood, it is basically a redox process. In the case of $Br_2$ as the treating agent, for example, a precursor donates two electrons to bromine ($Br_2 + 2e^- \rightarrow 2Br^-$), unstable ionic intermediates of the precursor are formed due to the sp³ nature of the (—$CR_sH$—) bridges. A neutral stable conjugated polymer with alternating aromatic and quinonoid sequences is preferentially formed by expelling the bridge hydrogens as HBr. The precursor polymers and processes yielded polymers of the general structure:

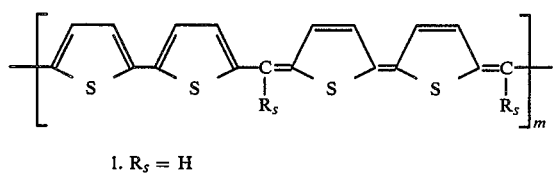

1. $R_s$ = H

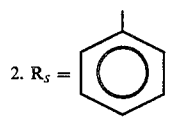

2. $R_s$ =

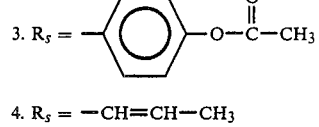

3. $R_s$ =

4. $R_s$ = —CH=CH—CH₃

EXAMPLES 5–8

In Examples 5–8, Example 1 was repeated using 2,5-thiophenediyl as $R_b$ and the $R_s$ shown below. These yielded conjugated polymers of the general structure:

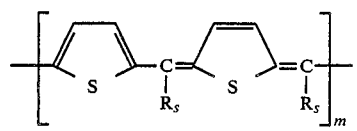

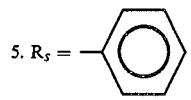

5. $R_s$ =

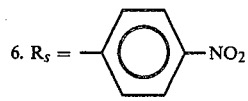

6. $R_s$ =      —NO₂

7. $R_s$ = H

8. $R_s$ = —CH=CH—CH₃

EXAMPLES 9–12

In Examples 9–12, Example 1 was again repeated using precursor polymers containing 2,5-thiophenediyl as the backbone group, $R_b$ and x=y=3 and the side group $R_s$ shown below. This produced conjugated polymers of the general structure:

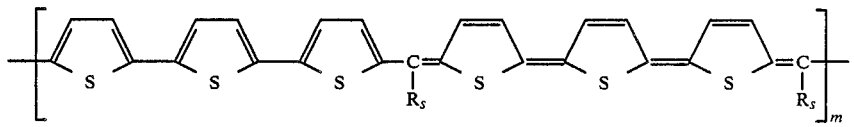

9. $R_s$ = H

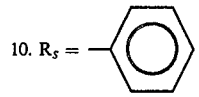

10. $R_s$ =

11. $R_s$ = —(CH₂)₅CH₃

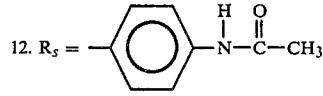

12. $R_s$ =

EXAMPLES 13–15

In Examples 13–15, Example 1 was repeated using 2,5-pyrrolediyl as the backbone group, $R_b$ and $R_s$ specified below. The conjugated polymers produced can be represented generically as follows:

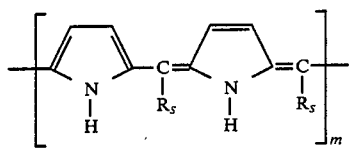

13. $R_s = H$

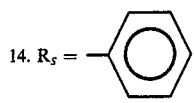

14. $R_s = $ —phenyl

15. $R_s = CH_3-S-CH_2-$

EXAMPLE 16

In this example, the same procedure was followed as in Example 1 except the backbone polymer group, $R_b$, was a furan group. This yielded conjugated polymers of the following structure:

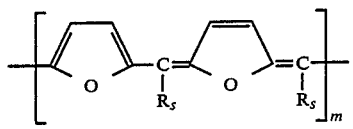

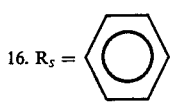

16. $R_s = $ —phenyl

The optical absorption spectra at different extends of elimination reaction at room temperature are shown in the single FIGURE. Precursor polymer PBTAB of Example 3 (curve 1) is a blue polymer and has a band gap ($E_g$) of 1.53 eV (810 nm) and $\lambda$max=692 nm (1.79 eV); a second peak is located at 580 nm (2.14 eV). After 15 min. reaction time, the electronic spectra is red shifted with $E_g$ now located at 1.13 eV (1100 nm). Progress in elimination further narrows the band gap as curves 3 to 12 show. No observable changes in the absorption spectra were seen after 24 hours (curve 12). Visually, the sample changes from blue to metallic gray in color. $E_g$ determined from curve 12 is about 0.83 eV (1500 nm). This indicates about 46% reduction in the band gap of precursor PBTAB and represents a large increase in $\pi$-electron delocalization. The FIGURE illustrates production of materials of tunable band gap over the range 0.83–1.53 eV.

EXAMPLE 17

The precursor polymers of Examples 1–6 were also each electrochemically treated in two different ways using a three-electrode electrochemical cell to obtain polymers of the formula structure 13. They were treated in film form (solid) deposited on a platinum (Pt) electrode and, in the alternative, in solution form in either tetrahydrofuran (THF) or N,N-dimethylformamide (DMF). The solid films were electrolyzed using Pt electrodes and a Ag/AgCl reference electrodes; the supporting electrolyte was tetraethyl/ammonium/perchlorate (TEAP) in acetonitrile. In solution, using identical electrochemical and supporting electrolyte, solutions of the precursors in THF and DMF in the nitrogen atmosphere were electrochemically converted by maintaining constant cell potentials during electrolysis. Details of the electrochemical redox treatments of polymeric solid solutions such as those employed here are taught in detail by the above-cited reference of A.F. Diaz. As far as can be ascertained by spectroscopic techniques, polymers resulting from electrochemical treatment were identical with the conjugated polymers of formula 13 obtained by chemical conversion as described in Examples 1–6.

EXAMPLE 18

Examples 1–6, 9, 10 and 12 were repeated except the redox reagents were in solution and the precursor polymers were solid films. Bromine and iodine solutions in hexane and methanol were effective in eliminating the bridge hydrogens but at a much slower rate than when the redox reagents were vapors. The resulting polymers were, however, identical to the conjugated polymers of Examples 1–6, 9, 10 and 12.

The embodiments of the invention in which an exclusive property or right is claimed are defined as follows:

I claim:

1. A method of making electroactive polymers having the structural formula:

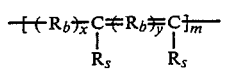

wherein backbone group $R_b$ is selected from the class consisting of five- and six-membered aromatic and heterocyclic rings, and combinations thereof, which exhibit aromatic and quinonoid bonding structures, selected from the group consisting of

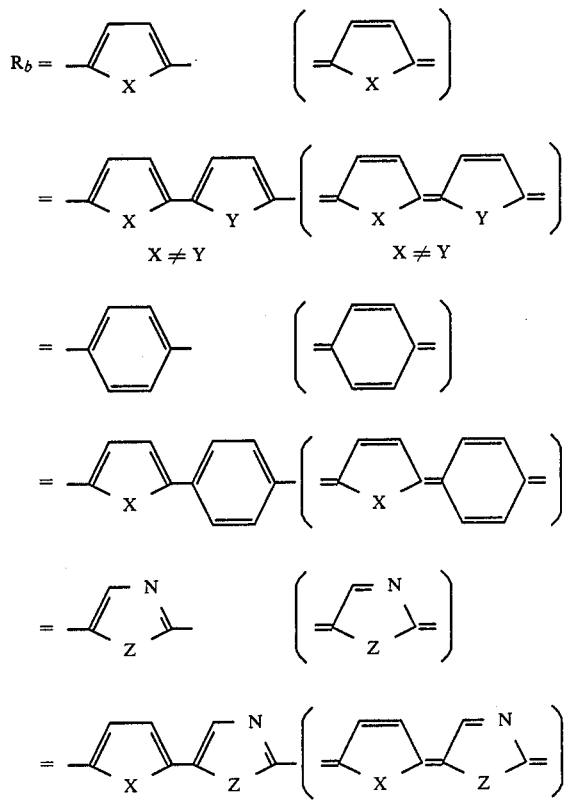

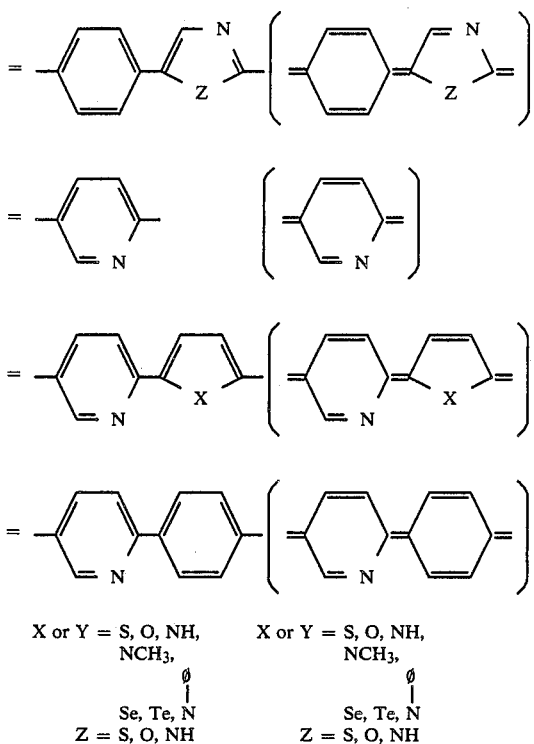

X or Y = S, O, NH, NCH$_3$, Se, Te, N
Z = S, O, NH

X or Y = S, O, NH, NCH$_3$, Se, Te, N
Z = S, O, NH side chain $R_s$ is selected from the class consisting of aliphatic, aromatic and heterocyclic groups derivable from an aldehyde of the formula $R_sCHO$;

x and y are positive integers having a value from 1 to 5;

and m is a positive integer having a value from 1 to about 10,000, comprising the step of converting nonconjugated polymer precursors of the structural formula,

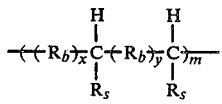

where $R_b$, $R_s$, x, y and m are as above, by removing the hydrogens (H) from the bridge carbons (C).

2. The method of claim 1 wherein $R_s$ is selected from $R_s$ = H

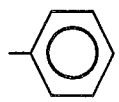

$CH_3$-(CH=CH)$_z$-

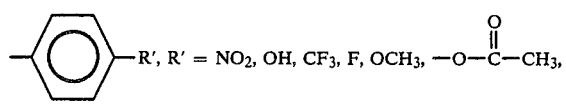

—N(CH$_3$)$_2$, —N—C—CH$_3$ (with H and O shown)

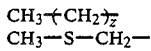

CH$_3$—S—CH$_2$—

3. The method of claim 1 wherein said hydrogens are removed by exposing the polymer precursors in solid form to a reactant selected from oxidizing and reducing vapors and electron donor or acceptor redox reagents in gaseous form.

4. The method of claim 2 wherein said hydrogens are removed by exposing the polymer precursors in solid form to a reactant selected from oxidizing and reducing vapors and electron donor or acceptor redox reagents in gaseous form.

5. The method of claim 3 wherein said reactant is halogen vapor.

6. The method of claim 4 wherein said reactant is halogen vapor.

7. The method of claim 5 wherein said reactant is selected from bromine and iodine.

8. The method of claim 6 wherein said reactant is selected from bromine and iodine.

9. The method of claim 1 wherein said reactant is selected from electron donor and acceptor reagents.

10. The method of claim 2 wherein said reactant is selected from electron donor and acceptor reagents.

11. The method of claim 1 wherein said hydrogens are removed electrochemically.

12. The method of claim 2 wherein said hydrogens are removed electrochemically.

13. The method of claim 11 wherein said polymer precursors are electrolyzed in film form deposited on platinum working electrodes.

14. The method of claim 12 wherein said polymer precursors are electrolyzed in film form deposited on platinum working electrodes.

15. The method of claim 11 wherein said polymer precursors are exposed to electrolysis in solution form.

16. The method of claim 12 wherein said polymer precursors are exposed to electrolysis in solution form.

17. A method of making electroactive polymers of the structural formula:

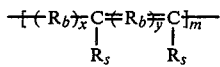

wherein backbone group $R_b$ is selected from the class consisting of five- and six-membered aromatic and heterocyclic rings, and combinations thereof, which exhibit aromatic and quinonoid bonding structures, selected from the group consisting of

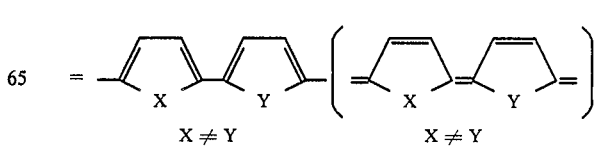

X ≠ Y     X ≠ Y

-continued

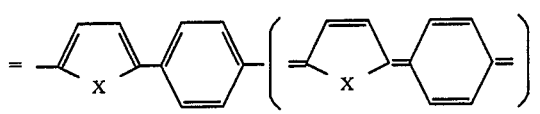

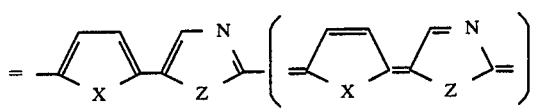

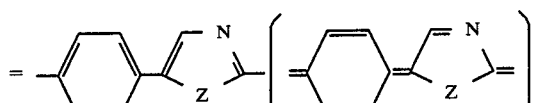

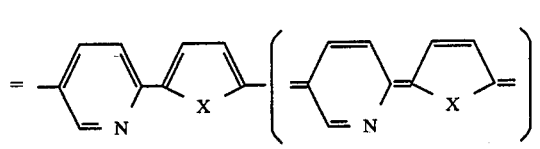

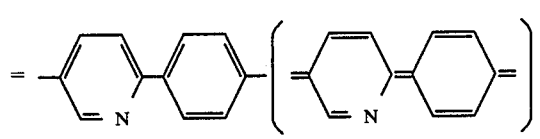

X or Y = S, O, NH, NCH₃, Se, Te, $\overset{\phi}{\underset{|}{N}}$
Z = S, O, NH

X or Y = S, O, NH, NCH₃, Se, Te, $\overset{\phi}{\underset{|}{N}}$
Z = S, O, NH side chain $R_s$ is selected from the class consisting of aliphatic, aromatic and heterocyclic groups derivable from an aldehyde of the formula $R_sCHO$;

x and y are positive integers having a value from 1 to 5;

and m is a positive integer having a value from 1 to about 10,000, comprising the steps of:

reacting an amount of aldehyde of the formula $R_sCHO$, wherein $R_s$ is defined as above, with amounts of monomers of the structure $R_b$, wherein $R_b$ is defined as above, in the presence of a compatible inert organic solvent and in the presence of a protic acid catalyst, employing a molar ratio of monomers to aldehyde of from about 0.1 to 1 to 2.0 to 1 to form precursor polymers of the structure

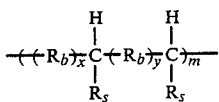

where $R_b$, $R_s$, x, y and m are as above; and converting the nonconjugated polymer precursors by removing the hydrogens (H) from the bridge carbons (C).

18. The method of claim 17 wherein $R_s$ is selected from the group consisting of:

$R_s$ = H

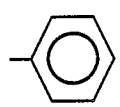

CH₃—(CH=CH)ₓ

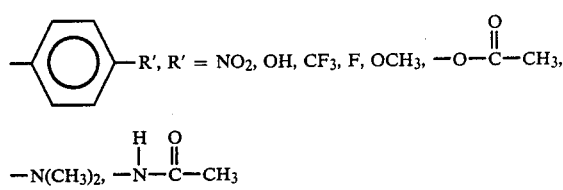

—N(CH₃)₂, $-\overset{H}{\underset{|}{N}}-\overset{O}{\underset{||}{C}}-CH_3$

CH₃—(CH₂)ₓ
CH₃—S—CH₂—

19. The method of claim 17 wherein said hydrogens are removed by exposing the polymer precursors in solid form to a reactant selected from oxidizing and reducing vapors and electron donor or acceptor redox reagents in gaseous form.

20. The method of claim 18 wherein said hydrogens are removed by exposing the polymer precursors in solid form to a reactant selected from oxidizing and reducing vapors and electron donor or acceptor redox reagents in gaseous form.

21. The method of claim 19 wherein said reactant is halogen vapor.

22. The method of claim 20 wherein said reactant is halogen vapor.

23. The method of claim 21 wherein said reactant is selected from bromine and iodine.

24. The method of claim 22 wherein said reactant is selected from bromine and iodine.

25. The method of claim 19 wherein said reactant is selected from electron donor and acceptor reagents.

26. The method of claim 20 wherein said reactant is selected from electron donor and acceptor reagents.

27. The method of claim 17 wherein said hydrogens are removed electrochemically.

28. The method of claim 18 wherein said hydrogens are removed electrochemically.

29. The method of claim 27 wherein said polymer precursors are electrolyzed in film form.

30. The method of claim 28 wherein said polymer precursors are electrolyzed in film form.

31. The method of claim 27 wherein said polymer precursors are exposed to electrolysis in solution form.

32. The method of claim 28 wherein said polymer precursors are exposed to electrolysis in solution form.

33. The method of claim 8 wherein:
$R_b$ is thiophene;
x=y=3;
$R_s$ is phenyl; and
said reactant is iodine vapor.

* * * * *